United States Patent [19]

Steiner et al.

[11] 4,075,105
[45] * Feb. 21, 1978

[54] STACKABLE COLANDER AND BASE

[75] Inventors: Fred S. Steiner, Woodmere; Morison S. Cousins, Plainview, both of N.Y.

[73] Assignee: Bonny Products, Inc., Hewlett, N.Y.

[*] Notice: The portion of the term of this patent subsequent to Dec. 6, 1991, has been disclaimed.

[21] Appl. No.: 644,567

[22] Filed: Dec. 29, 1975

[51] Int. Cl.$^2$ ............................................. B01D 23/00
[52] U.S. Cl. ........................................ 210/477; 248/94
[58] Field of Search ................... 210/415, 474–482, 210/248, 249, 250, 251; 55/378, 500; 206/503, 509; 99/413, 417, 450; 248/94, 99, 101

[56] References Cited

U.S. PATENT DOCUMENTS

| 576,798 | 2/1817 | Baldwin | 210/482 |
| 890,724 | 6/1908 | Stocking | 210/249 |
| 934,937 | 9/1909 | Schaubel | 248/94 |
| 1,372,147 | 3/1921 | Klos | 248/97 |
| 1,567,937 | 12/1925 | Galarneau | 210/480 |
| 1,927,192 | 9/1933 | Werner | 248/94 |
| 3,283,915 | 11/1966 | Maslow | 206/509 |
| 3,651,947 | 3/1972 | Schollhamer | 210/482 |

FOREIGN PATENT DOCUMENTS

| 9,062 of | 1909 | United Kingdom | 210/476 |

Primary Examiner—Bernard Nozick
Attorney, Agent, or Firm—Amster & Rothstein

[57] ABSTRACT

A colander is mounted within a stackable base adapted to rest on a surface and to support the colander above the surface. The base includes a top wall, which receives and retains the colander, and supporting legs with the colander disposed between them. These legs are shaped to permit a paired colander and base to be stacked within other paired colanders and bases.

3 Claims, 8 Drawing Figures

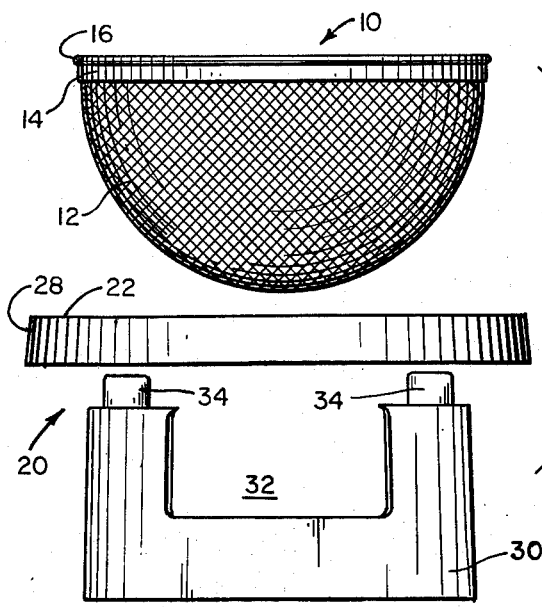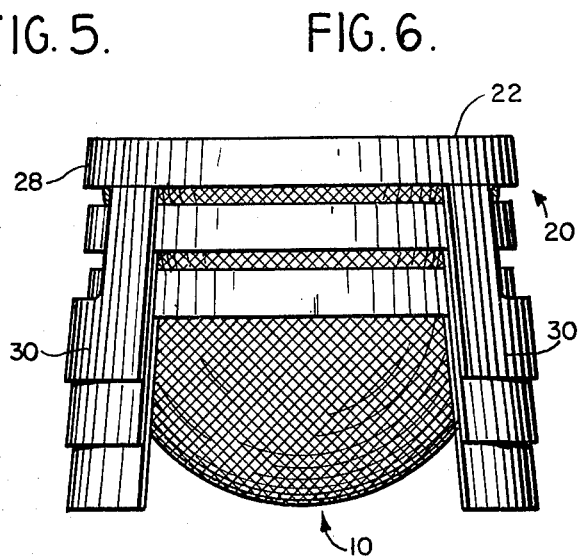
FIG. 5.　　FIG. 6.
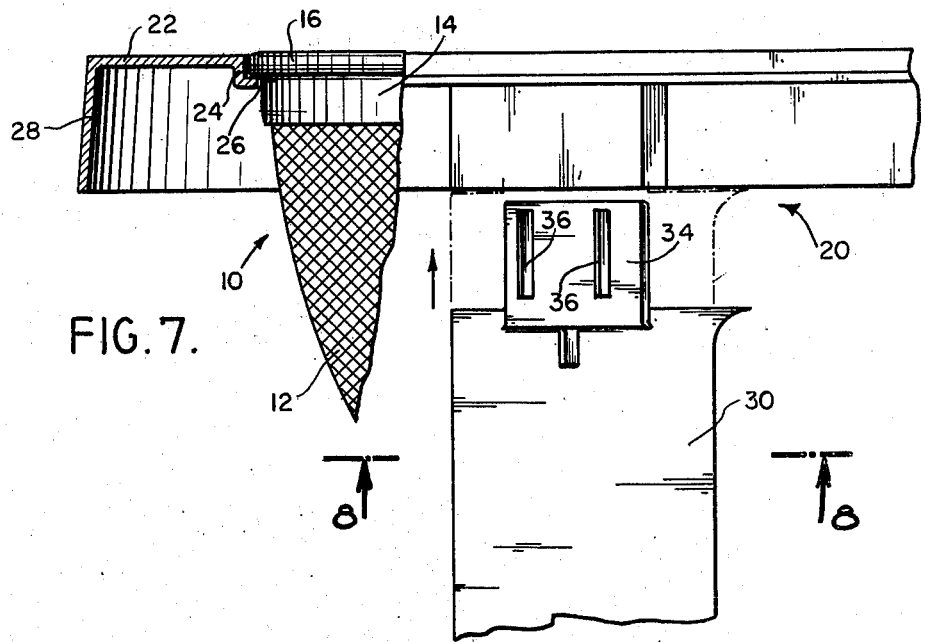
FIG. 7.
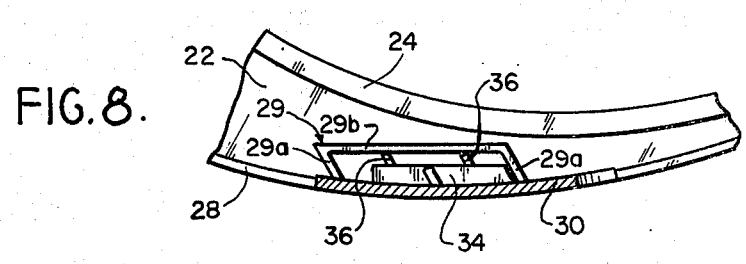
FIG. 8.

STACKABLE COLANDER AND BASE

This invention relates generally to colanders and in particular to a combination of a colander with a supporting base which combined structure is readily stacked within other structures of the same design.

A typical problem encountered in using some prior art colanders is that they must be supported within a bowl or some other similar vessel while in use to keep them from tipping over. To overcome this problem colanders have been built with legs to make them freestanding, as for example in U.S. Pat. No. 2,663,428. However, when this is done it is difficult, if not impossible, to stack such colanders in a stable manner, thus presenting a serious storage problem to the user or merchandiser who must keep large quantities of such colanders on hand for sale to the public.

It is therefore an object of this invention to provide a colander with a stackable base adapted to rest on a surface to support the colander above the surface which, when paired with a colander, is stackable within other paired colanders and bases.

It is another object of this invention to provide a stackable base for supporting a colander in which the colander is mounted for convenient removal and replacement.

It is another object of this invention to provide a stackable colander base comprised of readily assembled components which are conveniently shipped in disassembled form and quickly assembled at a later time.

In accordance with an illustrative embodiment demonstrating objects and features of the present invention, a stackable base including a top wall and a pair of legs depending from the top wall is adapted to rest on a surface. A colander having a supporting rim is received in the top wall of the base and is supported above the surface. The base is shaped so that a paired colander and base is stackable within other paired colanders and bases. In one illustrative embodiment of the invention the top wall and depending legs conform generally to the surface contour of a frustum of a cone.

These and other objects and features of the invention are best understood by reference to the following detailed description of an illustrative embodiment of the invention when taken in conjunction with the accompanying drawing in which:

FIG. 5 is an exploded front elevational view showing the colander and base separated to aid in understanding the assembly of a paired colander and base;

FIG. 6 shows a number of paired colanders and bases stacked according to the invention;

FIG. 7 is a view partially in section and partially broken away showing a colander received within its base and the legs of the base prior to attachment to the top wall, with the broken line outline representing the position of a leg after it is mounted to the top wall; and FIG. 8 is a sectional view taken along the line 8—8 of FIG. 7 and in the direction of the arrows showing an arrangement for joining the depending legs to the top wall.

Figure 1:
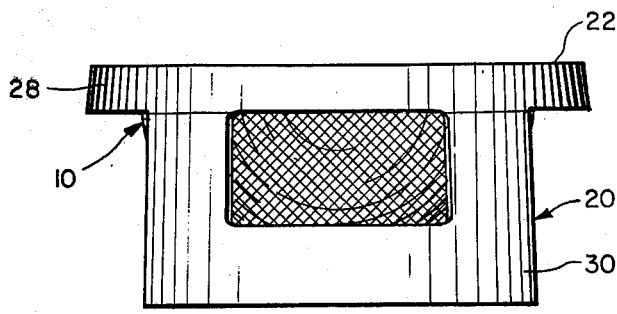
FIGS. 1, 2, 3 and 4 are respectively front, side, top and bottom views of a paired colander and base illustrating features of the invention.
Figure 2:
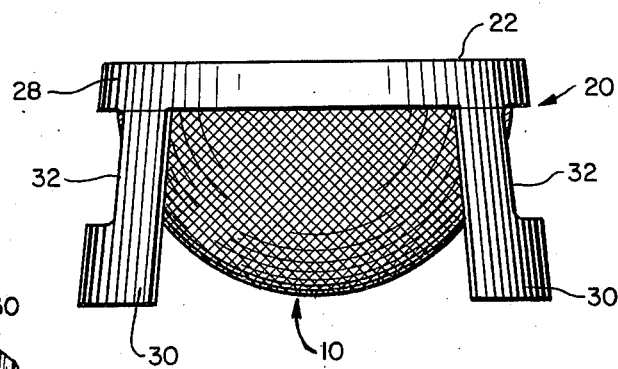
Figure 3:
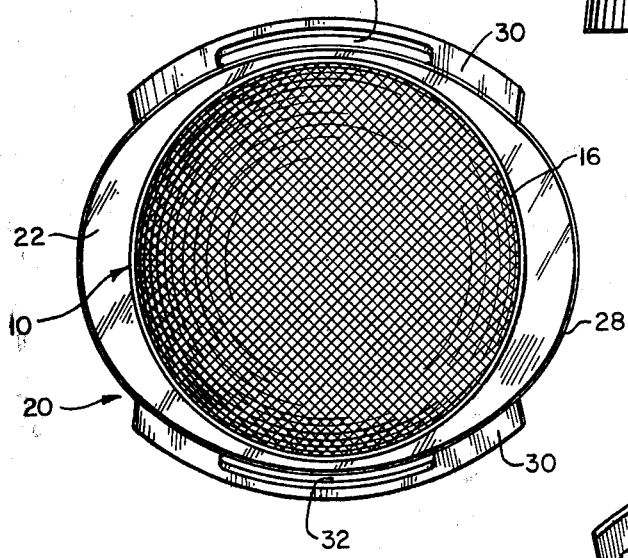
Figure 4:
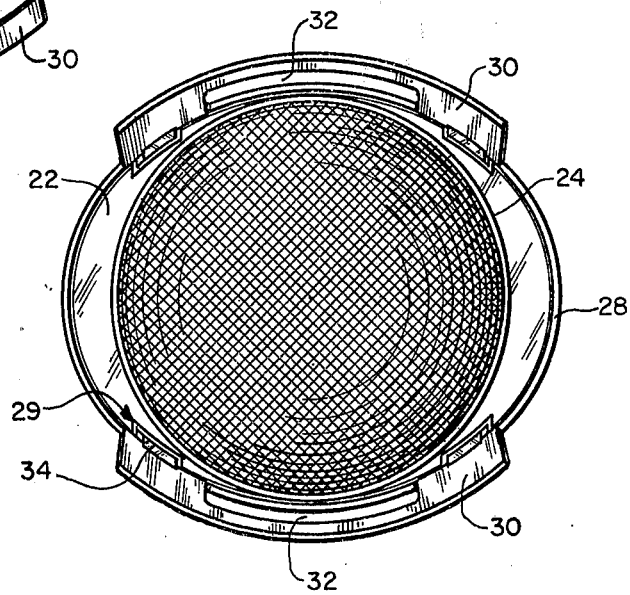

Referring now to FIGS. 1-4 there is shown a colander, generally designated as 10, supported within the base 20 which is adapted to rest on a surface and to suspend the colander above the surface. Base 20 includes a top wall 22 for receiving and retaining colander 10 and has depending legs 30 which support the entire structure.

The base is constructed so that, paired with a colander, it can be stacked within other paired colanders and bases. This is illustrated in FIG. 6 where three paired colanders and bases are stacked with the legs of each base engaging the base below and the colanders nesting one within the other. Stackability is achieved with a base of any shape which permits the depending legs to be fitted over the top wall of the base below and to engage its depending legs. For example, the base may have the general surface contour of a frustum of a cone or hemisphere. Alternatively, the legs may be made of a flexible material such as plastic so that they may be deformed to permit a base to be placed over the base below for stacking.

As can be seen by reference to FIGS. 5 and 7, colander 10 includes a body 12 made of any convenient permeable material, for example, metal screening, and supporting rim 14 having an annular flange 16, which is attached to the periphery of the colander to retain the colander shape, and is supporting the colander in the base, as explained more fully below.

Base 20 is preferably formed of any sturdy sheet material such as plastic. As best seen in FIG. 7, top wall 22 of base 20 includes a recessed seat 24 forming a colander receiving opening 26 for engaging flange 16 of colander 10. The diameter of recessed seat 24 is preferably selected to provide a slight interference for flange 16 so that rim 14 can be securely retained within base 20. Extending from top wall 22 is skirt 28 which includes on its inner surface a plurality of leg retaining members or sheaths 29 to be described in more detail subsequently.

Legs 30 are made long enough to support the colander 10 above the surface on which they rest. As illustrated, legs 30 are provided with a large center cut-out section 32, which saves substantially on material and results in a combination of colander and base which is more appealing to the eye. Legs 30 are conveniently produced as flat pieces of flexible material such as plastic and are bent to conform to the shape of skirt 28 when the base 20 is assembled. This bending lends rigidity and strength to the base.

Referring to FIGS. 7 and 8, each of legs 30 is formed with a plurality of tongues 34 which are received within the sheaths 29 when the base is assembled. Each tongue includes a pair of locking ribs 36 which project inwardly from the surface of the tongue. In the assembled base each of tongues 34 is retained within one of sheaths 29 by engagement of the locking ribs 36 with the opposing side wall 29b of the sheath.

FIG. 8 shows one of the ribs 34 fully locked within one of the sheaths 29. Skirt 28 forms one wall of sheath 29 and the sheath further includes a pair of short walls 29a and a long wall 29b connecting walls 29a. Short walls 29a are angularly disposed with respect to a perpendicular to skirt 28 and similarly locking ribs 36 are angularly disposed with respect to a perpendicular to the surface of tongue 34 to provide resilient engagement between the tongue 34 and sheath 29. Preferably, locking ribs 36 are narrower at the top than at the bottom of tongue 34 to permit easier insertion of the tongue into sheath 29.

The invention has been shown and described in one form in which the base is formed from three separate pieces: the top wall; and two depending legs. However, the base could equally as well be formed as a unitary structure using a single mold as is well known in the art.

Although a specific embodiment has been disclosed for illustrative purposes it will be apparent to one skilled in the art that many modifications, additions and substitutions are possible without departing from the scope and spirit of the disclosure. For example, it will be appreciated that legs 30 could be secured to base 20 by alternate means such as by providing a second skirt within and in confronting relationship to skirt 28.

What is claimed is:

1. An apparatus including a colander having a supporting rim and a colander body formed of a permeable material attached to and depending from said supporting rim and a colander supporting base, said colander supporting base being open at the top and bottom and including a top wall and a pair of arcuate legs depending from said top wall, said arcuate legs having inner and outer surfaces, said outer surface of said legs imparting to said base the shape of a frustum of a cone with the bottom of said base wider than the top, the inner surface of said pair of arcuate legs having a frustum shape geometrically similar to the shape of said outer surface, said top wall having a recess adapted to receive and supporting said colander rim on said base top wall with said colander body suspended between said legs, whereby said colander and base is stackable with other paired colanders and bases with said inner surface of one of said paired colanders and bases securely resting upon said geometrically similar outer surface of another of said paired colanders and bases.

2. The apparatus of claim 1 further including means cooperatively mounted on said legs and said top wall for detachably joining said legs and said top wall.

3. The apparatus of claim 1 wherein each of said legs includes a tongue member formed proximate the upper ends of each of said legs, each tongue member including a locking rib extending at an angle from the surface thereof, said top wall including a tongue receiving member so that said legs are joined to said top wall with said tongue member in said tongue receiving member and secured to said top wall by engagement between the locking rib and the surface of said tongue receiving members.

* * * * *